(12) United States Patent
Erez

(10) Patent No.: US 8,117,414 B2
(45) Date of Patent: Feb. 14, 2012

(54) METHOD FOR PRIORITIZED ERASURE OF FLASH MEMORY

(75) Inventor: Eran Erez, Gedera (IL)

(73) Assignee: Sandisk IL Ltd., Kfar Saba (IL)

( * ) Notice: Subject to any disclaimer, the term of this patent is extended or adjusted under 35 U.S.C. 154(b) by 854 days.

(21) Appl. No.: 11/797,377

(22) Filed: May 3, 2007

(65) Prior Publication Data

US 2008/0056012 A1 Mar. 6, 2008

Related U.S. Application Data

(60) Provisional application No. 60/824,452, filed on Sep. 4, 2006.

(51) Int. Cl.
*G06F 12/00* (2006.01)

(52) U.S. Cl. ............ 711/166; 711/103; 726/26

(58) Field of Classification Search ........ 711/103, 711/158, 166; 713/194; 726/26
See application file for complete search history.

(56) References Cited

U.S. PATENT DOCUMENTS

| | | | | |
|---|---|---|---|---|
| 5,742,787 | A * | 4/1998 | Talreja | 711/103 |
| 6,487,633 | B1 * | 11/2002 | Horst et al. | 711/112 |
| 6,732,221 | B2 * | 5/2004 | Ban | 711/103 |
| 6,795,894 | B1 * | 9/2004 | Neufeld et al. | 711/113 |
| 6,874,092 | B1 * | 3/2005 | Motoyama et al. | 713/300 |
| 6,898,662 | B2 | 5/2005 | Gorobets | |
| 7,080,192 | B1 * | 7/2006 | Wong | 711/103 |
| 7,444,682 | B2 * | 10/2008 | Li et al. | 726/32 |
| 2002/0099903 | A1 * | 7/2002 | Lakhani et al. | 711/5 |
| 2004/0114431 | A1 * | 6/2004 | Shona | 365/185.11 |
| 2004/0188710 | A1 | 9/2004 | Koren et al. | |
| 2005/0081009 | A1 * | 4/2005 | Williams et al. | 711/163 |
| 2005/0256997 | A1 | 11/2005 | Koren et al. | |
| 2006/0021007 | A1 * | 1/2006 | Rensin et al. | 726/2 |
| 2007/0079054 | A1 * | 4/2007 | Rudelic | 711/103 |
| 2007/0086257 | A1 * | 4/2007 | Bernier et al. | 365/218 |
| 2007/0288687 | A1 * | 12/2007 | Panabaker | 711/103 |
| 2008/0059692 | A1 * | 3/2008 | Erez | 711/103 |

FOREIGN PATENT DOCUMENTS

GB 2317722 4/1998

OTHER PUBLICATIONS

Ben Rockwood, "RAID Theory: An Overview", Apr. 8 2002, The Cuddletech Veritas Volume Manager Series.*
Tsur O: "Enabling data security with COTS solid-state flash disks" Non-Volatile Memory Technologh Symposium, 2004 Orlando, FL, USA Nov. 15-17, 2004, Piscataway, NJ, USA, IEEE,US, pp. 131-134, XP010757117.

* cited by examiner

*Primary Examiner* — Matthew Bradley
(74) *Attorney, Agent, or Firm* — Martine Penilla Group, LLP

(57) ABSTRACT

A method for prioritized erasure of a non-volatile storage device, the method including the steps of: providing at least one flash unit of the storage device, wherein each flash unit has a plurality of blocks; writing data into the plurality of blocks; assigning an erasure-priority to each block, wherein the erasure-priority correlates with an erasure-priority of the data; and erasing the data in each block according to the erasure-priority of each block upon receiving an emergency-erase command. Preferably, the step of writing data into the plurality of blocks is performed in an arbitrary order in a first flash unit, and the step of writing into subsequent flash units is performed in correlation with the order in the first flash unit. Preferably, the step of erasing includes aborting erasure, before completing the erasure, for at least some of the plurality of blocks.

6 Claims, 3 Drawing Sheets

METHOD FOR PRIORITIZED ERASURE OF FLASH MEMORY

RELATED APPLICATIONS

This patent application claims priority under 35 U.S.C. §119(e) to U.S. Provisional Application No. 60/824,452, filed Sep. 4, 2006, which is hereby incorporated by reference in its entirety.

This patent application is related to U.S. patent application Ser. No. 11/797,378, now U.S. Pat. No. 7,975,119 of the same inventors, which is entitled "DEVICE FOR PRIORITIZED ERASURE OF FLASH MEMORY" and filed on the same day as the present application. This patent application, also claiming priority to U.S. Provisional Application No. 60/824,452, is incorporated in its entirety as if fully set forth herein.

FIELD AND BACKGROUND OF THE INVENTION

The present invention relates to methods for managing the storage and erasure of data in a storage device in such a way that more critical data is erased before less critical data is erased.

The need to erase data in a storage device is well-known in the art of computer engineering, and is generally motivated by two alternative needs:
(1) the need to clear space for new data; and
(2) the need to destroy confidential information for a storage device having a secure area.

While the first reason has no urgency, the second reason is vital in critical situations. The "window of time" between the decision to erase the data and the loss of control over the storage device can be very short. Often, the time available for erasing a storage device is shorter than the time required for complete erasure of the entire storage device. Unfortunately, the prior art does not teach methods for organizing the erasure procedure so that more critical data is erased before less critical data is erased.

It would be desirable to have methods for ensuring that when a critical erasure is needed, the most critical data is erased first. Such a prioritized-erasure procedure would provide best-choice solutions in time-critical situations.

SUMMARY OF THE INVENTION

It is the purpose of the present invention to provide methods for managing the storage and erasure of data in a storage device in such a way that more critical data is erased before less critical data is erased.

For the purpose of clarity, several terms which follow are specifically defined for use herein. The term "erasure procedure" is used herein to refer to an electronic process by which the content of a block is rendered useless by either: (1) setting all cells of the block to the same logical value, or (2) randomizing the content of all the cells of the block. The term "prioritized erasure" is used herein to refer to an erasure procedure in which parts of a memory are erased according to an erasure-priority protocol. The term "block" is used herein to refer to a physical part of a flash-memory storage device. The term "sanitized erasure" is used herein to refer to an erasure procedure by which the content of a digital memory is destroyed so that the content cannot be restored by any forensic means. Such sanitized erasure is in contrast to an ordinary erasure procedure that makes the content useless for ordinary reading commands, but may not prevent restoration by advanced technological means. The term "flash unit" is used herein to refer to a portion of flash-memory in a flash-memory device.

The present invention applies to both single-level-cell (SLC) flash memories and multi-level-cell (MLC) flash memories. While the subsequent discussion focuses primarily on SLC cells, it will be clear to those skilled in the art how the present invention applies to MLC cells (and to other non-volatile storage devices in general). The terms "erasing", "erasure", and "writing" are used herein to refer to setting threshold voltages of a memory cell, where erasing and erasure typically set the voltages to correspond to one-logic values, and writing typically sets the voltages to correspond to zero-logic values for SLC cells. The terms "writing" and "programming" are used interchangeably herein. The present invention is particularly applicable to NAND-type flash memories that are read and programmed a page at a time.

Table 1 shows three alternate embodiments of the present invention.

TABLE 1

Three alternate embodiments of the present invention.

| Embodiment | Writing first flash unit | Writing other flash units | Logging | Emergency erasure | Comments |
| --- | --- | --- | --- | --- | --- |
| 1 | Arbitrary | Arbitrary | All high erasure-priority locations | According to the log | Simplest block allocation in writing |
| 2 | Prescribed | Prescribed | N/A | According to prescription | Most effective emergency erasure |
| 3 | Arbitrary | Aligned with first flash unit | Only first flash unit | According to log | Optimized performance between Embodiments 1 and 2 |

In a preferred embodiment of the present invention, data is stored in a flash memory in an arbitrary manner that does not dictate any constraints on the writing allocation, as shown in Table 1, Embodiment 1, and described below. Rather, the location of the written blocks that contain critical data is recorded, and the erasure is performed according to these records.

In another preferred embodiment of the present invention, the data is stored in a flash unit in a manner that ensures the fastest erasure of the high erasure-priority data, as shown in Table 1, Embodiment 2, and described below. Certain areas of the flash units are reserved for high erasure-priority blocks. In emergency situations, the reserved areas are erased before any other parts of the flash units are erased. The locations of blocks available for writing data are predetermined according to each block's erasure-priority.

In another preferred embodiment of the present invention (as shown in Table 1, Embodiment 3, and described below), the data is stored in the flash unit in a way that combines the advantages of Embodiments 1 and 2. In Embodiment 3, writing is performed as fast as in Embodiment 1, and erasure is performed as fast as in Embodiment 2. The writing of the first flash unit is performed in a random order in Embodiment 3 (similar to Embodiment 1), and then the locations of the high erasure-priority areas in the rest of the flash units are aligned according to the first flash unit. Embodiment 3 is as fast as Embodiment 1 in writing the first flash unit, and as fast as Embodiment 2 upon emergency erasure.

The prioritized erasure of flash memory can be implemented using at least three different procedures:
(1) an ordinary erase command, such as that described in the technical data sheet of the K9F1G08U0A flash memory available from Samsung Electronics, Suwon, South Korea;
(2) a sanitized erasure, such as that taught in Koren et al., US Patent Application No. 20040188710; and
(3) an interrupted erasure, such as that described in detail below.

The prioritized-erasure procedures that are described in the present invention include both the selection of the erasure procedure and the erasure order.

Therefore, according to the present invention, there is provided for the first time a method for prioritized erasure of a non-volatile storage device, the method including the steps of: (a) providing at least one flash unit of the storage device, wherein each flash unit has a plurality of blocks; (b) writing data into the plurality of blocks; (c) assigning an erasure-priority to each block, wherein the erasure-priority correlates with an erasure-priority of the data; and (d) erasing the data in each block according to the erasure-priority of each block upon receiving an emergency-erase command.

Preferably, the step of writing is performed on arbitrarily-selected blocks, and the step of assigning is performed according to the erasure-priority of the data.

Preferably, the step of assigning is performed prior to the step of writing, and the step of writing is performed according to the erasure-priority of each block.

Preferably, the step of writing data into the plurality of blocks is performed in an arbitrary order in a first flash unit, and the step of writing into subsequent flash units is performed in correlation with the order in the first flash unit.

Most preferably, the step of assigning includes assigning a common erasure-priority to blocks having a common relative position in each respective flash unit.

Preferably, the method further includes the steps of: (e) storing a log of the erasure-priority for each block; and (f) erasing the data in each block according to the erasure-priority stored in the log upon receiving the emergency-erase command.

Preferably, the step of erasing includes aborting erasure, before completing the erasure, for at least some of the plurality of blocks.

According to the present invention, there is provided for the first time a method for prioritized erasure of a hard-disk drive, the method including the steps of: (a) providing at least two sectors of the hard-disk drive; (b) writing data into the sectors; (c) assigning an erasure-priority to each sector, wherein the erasure-priority correlates with an erasure-priority of the data; and (d) erasing the data in each sector according to the erasure-priority of each sector upon receiving an emergency-erase command.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to methods for managing the storage and erasure of data in a storage device in such a way that more critical data is erased before less critical data is erased. The principles and operation for managing the storage and erasure of data in a storage device, according to the present invention, may be better understood with reference to the accompanying description and the drawings.

In Embodiment 1 of Table 1 above, the writing process is arbitrary, a log documents the allocation of blocks to various erasure-priority levels, and the erasure is performed according to the log.

In Embodiment 2 of Table 1 above, the writing process is performed according to a reserved allocation of blocks to high erasure-priority levels, and the erasure is performed according to the allocation.

In Embodiment 3 of Table 1 above, the writing of the first flash unit is performed arbitrarily, as in Embodiment 1. Such an arbitrary allocation then prescribes the allocation in the rest of the flash units, and the erasure is performed as in Embodiment 2.

Figure 1:
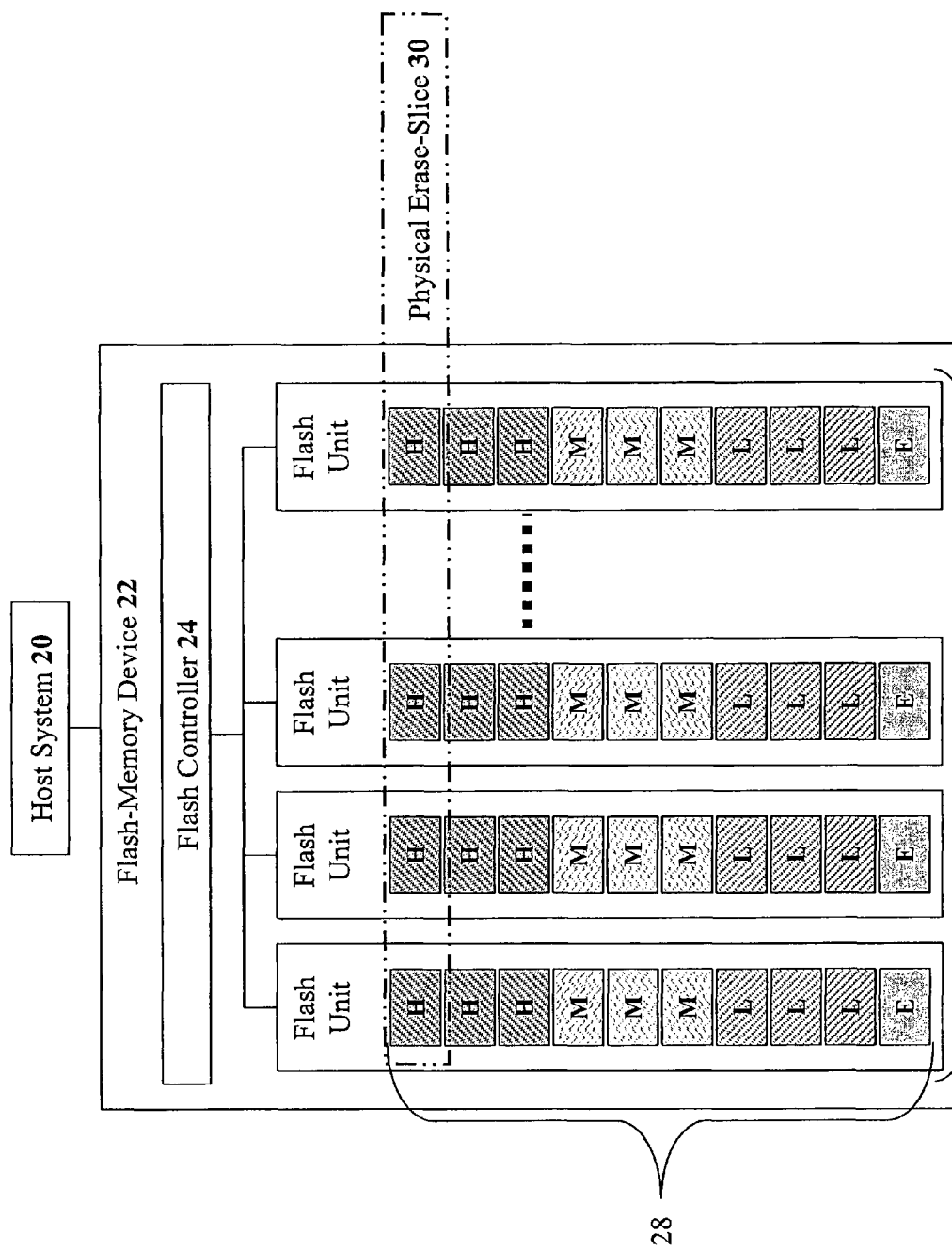
FIG. 1 is a simplified schematic block diagram of a flash-memory system using a prioritized-erasure procedure that erases using physical erase-slices, according to a preferred embodiment of the present invention.

Referring now to the drawings, FIG. 1 is a simplified schematic block diagram of a flash-memory system using a prioritized-erasure procedure that erases using physical erase-slices, according to a preferred embodiment of the present invention. A host system 20 is shown connected to a flash-memory device 22, having a flash controller 24 and a plurality of flash units 26.

Each flash unit 26 has a number of blocks 28 that can be individually addressed for erasure. Such a structure for a flash-memory disk drive is well-known in the art, and is found in components such as FFD-25-UATA-8192-A, available from SanDisk IL Ltd., Kefar Saba, Israel.

Some of blocks 28 in flash units 26 are selected to accommodate high erasure-priority data (shown as blocks H in FIG. 1). The positions of blocks H are made known to the writing mechanism of host system 20. The writing mechanism is typically flash controller 24, but can also be host system 20. The writing mechanism then allocates data of high erasure-priority to blocks H. Other blocks 28 in flash units 26 are selected to accommodate medium and low erasure-priority data (shown as blocks M and L, respectively, in FIG. 1). The positions of blocks M and L are also made known to the writing mechanism of host system 20. The writing mechanism then allocates data of lower erasure-priority to blocks M and L. There can be any number of erasure-priority levels for the selective allocation of data to blocks 28.

In a preferred embodiment of the present invention, some blocks 28 are designated with an excluded erasure-priority excluding the designated blocks from the prioritized-erasure procedure (shown as blocks E in FIG. 1). Data can be allocated to blocks E that do not need to be erased in the event of an emergency-erase situation. Upon the need to urgently erase the data in flash-memory device 22, the erasure mechanism erases blocks 28 according to their designated erasure-priority, ensuring that the data is erased in the correct order.

A "physical erase-slice" is a collection of blocks from several flash units, where each of the selected blocks has the same address in its respective flash unit. If the blocks are allocated, upon writing, so that selected erasure-priority blocks in each flash unit share the same address, then the optimal prioritized erasure can be performed by physical erase-slices.

A physical erase-slice 30 is shown in FIG. 1 representing a collection of blocks 28 across several flash units 26. While blocks H are shown as part of physical erase-slice 30 in FIG. 1, physical erase-slice 30 can include any "slice" of blocks 28. In a preferred embodiment of the present invention, erasure of blocks 28 in physical erase-slice 30 is performed simultaneously.

In some flash-memory architectures, the erasure of some blocks is faster than for other blocks due to the heterogeneous structure of the flash memory. In the present embodiment described in FIG. 1, in which blocks are pre-allocated for high erasure-priority, it is preferable to use the inherently fast-erasing blocks for allocation to the high erasure-priority data. A protocol can be applied where high erasure-priority data resides in fast-erasing blocks. In such systems, the fast-erasing blocks are selected to accommodate the higher erasure-priority data. By doing so, the high erasure-priority data will be erased faster.

It should be noted that in the present embodiment, high erasure-priority blocks are allocated to flash units randomly. Since the erasure procedure erases one block in each flash unit during an erase cycle, it may occur that, in some flash units, there will be remaining blocks to be erased, while in other flash units, all the high erasure-priority blocks have already been erased. Such a situation results in a loss in efficiency. The erasure procedure continues to erase a smaller number of blocks in each cycle until the last high erasure-priority block in the last flash unit is erased.

Figure 2:
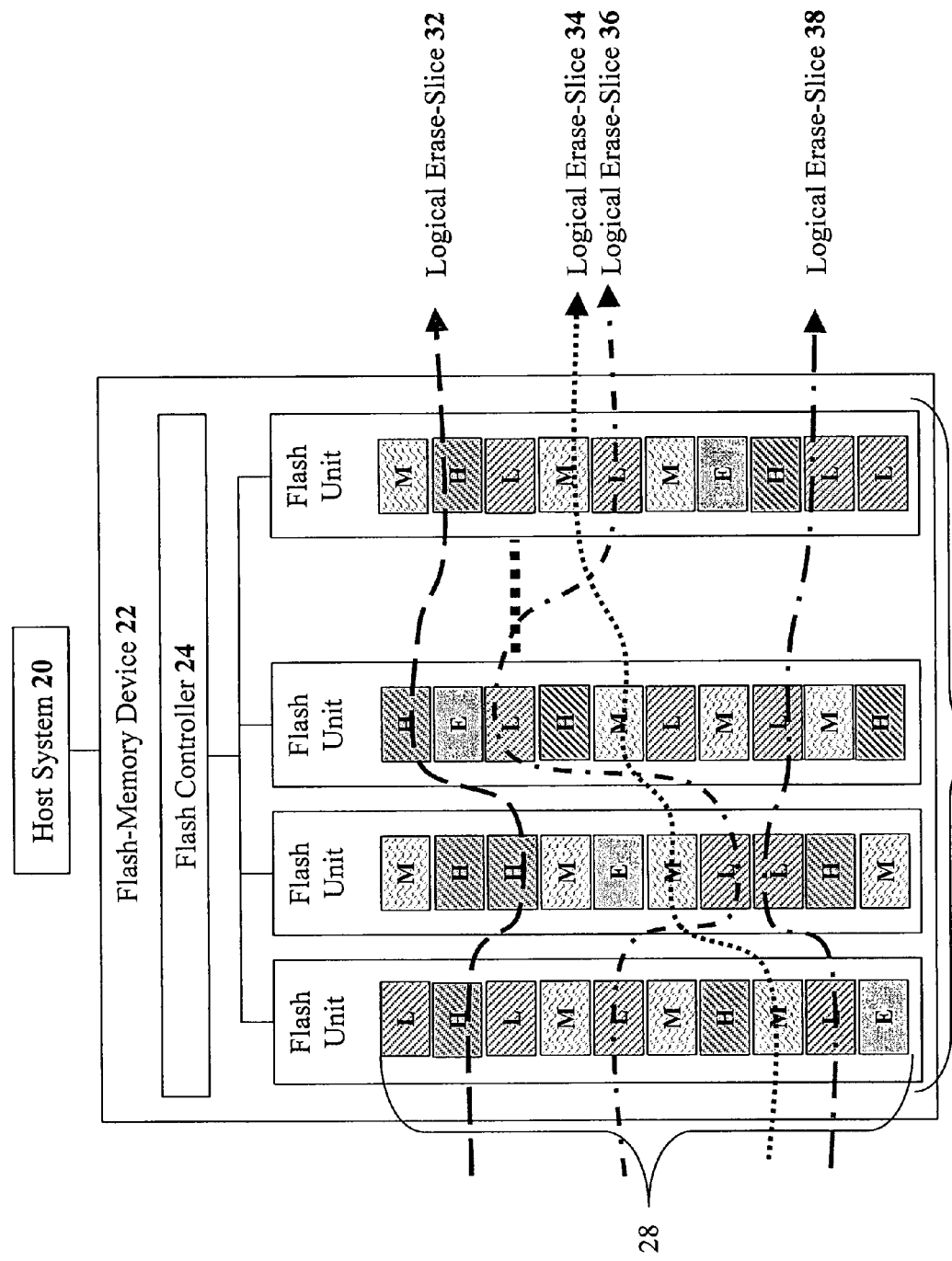
FIG. 2 is a simplified schematic block diagram of a flash-memory system using a prioritized-erasure procedure that erases using logical erase-slices, according to a preferred embodiment of the present invention.

FIG. 2 is a simplified schematic block diagram of a flash-memory system using a prioritized-erasure procedure that erases using logical erase-slices, according to a preferred embodiment of the present invention. In this embodiment, the writing process is optimized by engineering considerations that are not related to the present invention, and are taught in the prior art of flash-memory device configurations such as in Gorobets, U.S. Pat. No. 6,898,662.

Typically, writing will not be performed by a contiguous set of blocks 28, one flash unit 26 after the other, but rather "across the board" where data is written on several flash units 26 in parallel. Upon writing, a record is made in a log table (not shown) of the erasure-priority of each written block 28, or at least blocks H (i.e. the blocks in which high erasure-priority data is written). For the purpose of the disclosure of present invention, it is assumed that there are three levels of erasure-priority, and that the majority of the blocks do not have any erasure-priority (i.e. blocks E). Therefore, there is no risk if the data in blocks E are left un-erased.

As is known in the art of flash-memory engineering, the erasure of a multi-unit flash-memory device is most efficient when a block is simultaneously erased in each of the flash units during an erasure cycle. However, if the blocks are not pre-arranged according to their erasure-priority, a physical erase-slice cannot be performed. In such a case, a "logical erase-slice" can be performed.

A "logical erase-slice" is a collection of one, arbitrary, representative block 28 out of each flash unit 26 (e.g. blocks H, M, or L in FIG. 2). The present embodiment makes use of the fact that a single erasure cycle can erase blocks of different position in each flash unit 26 in one operation. A logical erase-slice can be erased simultaneously by providing the address of the selected block 28 in each flash unit 26, and then applying the erase command to all flash units 26, where in each flash unit 26, the selected block 28 is erased. Such a procedure provides a way to erase blocks 28, in each flash unit 26, according to their relative erasure-priority.

Flash-memory device 22 can erase either a physical erase-slice or a logical erase-slice in a single erasure cycle. In FIG. 1, the data is organized in an architecture that is optimal for erasure of blocks in physical erase-slices. In FIG. 2, the data is organized arbitrarily; thus, a mechanism that erases the blocks by logical erase-slices has to be implemented.

When there is a need to urgently erase flash-memory device 22, flash controller 24 checks the log table to find the highest erasure-priority blocks in each of flash units 26. A set of blocks H from each flash unit 26 becomes a logical erase-slice 32, as shown in FIG. 2. Logical erase-slice 32 is erased, and the log table is updated to reflect that these blocks have been erased. Note that not all blocks H are erased in logical erase-slice 32, only one block H from each flash unit 26. Flash controller 24 then picks the next highest erasure-priority block in each flash unit 26 (e.g. blocks M). A set of blocks M from each flash unit 26 becomes a logical erase-slice 34 that is erased, and the log table is updated again. This process continues (e.g. logical erase-slices 36 and 38) until there are no more high erasure-priority blocks in any of flash units 26. In practice, after logical erase-slice 32 is erased, the next logical erase-slice chosen may also include only blocks H. Such a procedure can continue until blocks H are no longer in the log table, then logical erase-slice 34 (i.e. blocks M) can be erased, or until the process of erasure is externally stopped.

Figure 3:
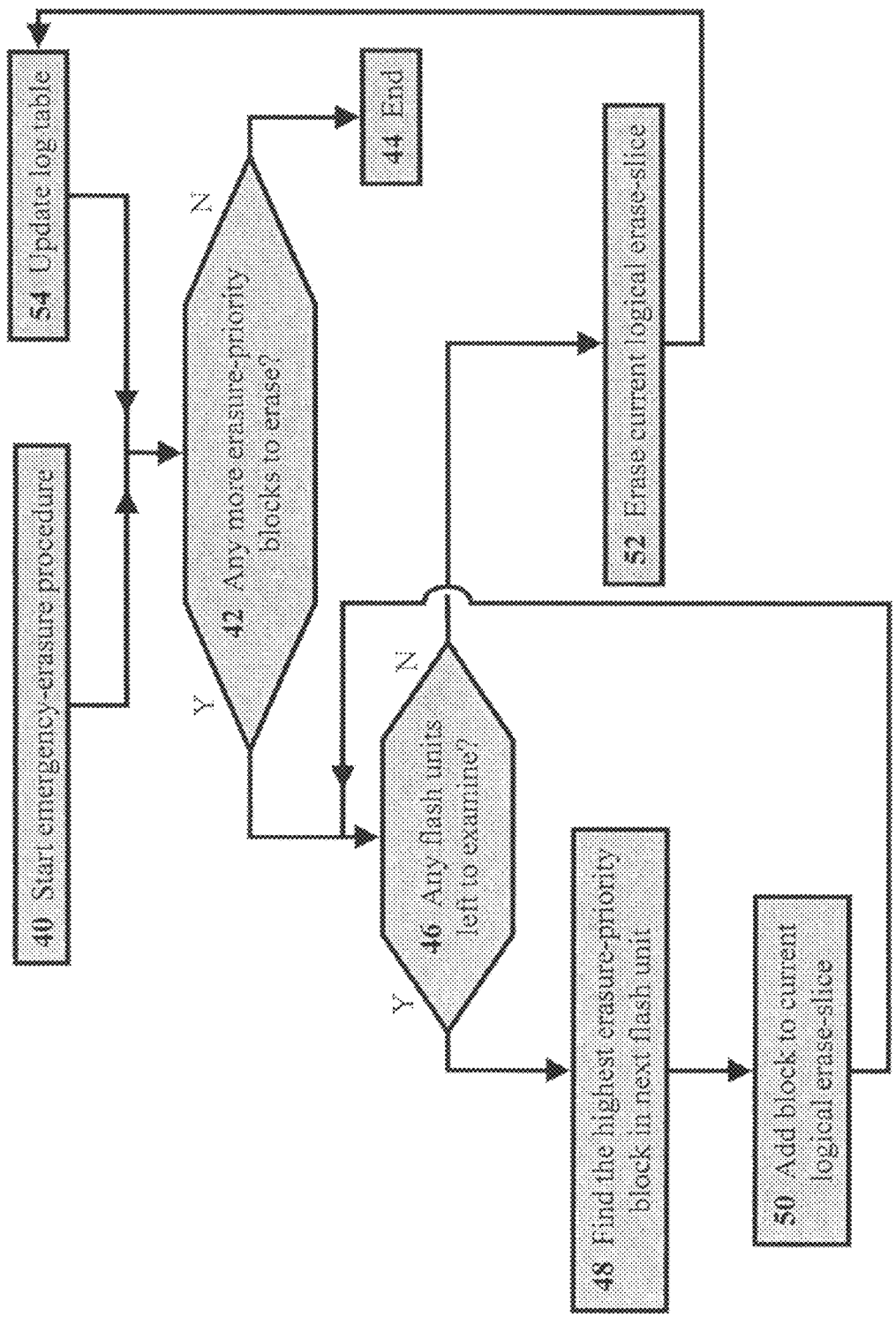
FIG. 3 is a simplified flowchart of a prioritized-erasure procedure, according to a preferred embodiment of the present invention.

FIG. 3 is a simplified flowchart of a prioritized-erasure procedure, according to a preferred embodiment of the present invention. Upon receiving an emergency-erase command from the host system, the controller of the flash-memory device begins the prioritized-erasure procedure (Step 40). The controller checks whether or not there are erasure-priority blocks to be erased (Step 42). If there are no erasure-priority blocks to be erased, the prioritized-erasure procedure ends (Step 44). If there are erasure-priority blocks to be erased, the controller checks whether or not there are any flash units left to examine (Step 46). If there are still flash units to be examined, the controller seeks the highest erasure-priority block in the next flash unit (Step 48), and proceeds to add the block to the current logical erase-slice (Step 50). Then, the controller again checks whether or not there are any flash units left to examine (Step 46). Once all flash units have been examined, the current logical erase-slice is erased (Step 52), with all blocks contained in the logical erase-slice erased in parallel. The log table is then updated accordingly (Step 54).

In a preferred embodiment of the present invention, an "interrupted-erase" cycle is used instead of a "full-erase" cycle. A full-erase cycle is an erasure procedure that takes a relatively long time, typically 2.5 milliseconds, and ensures that the erasure is "clean" in the sense that all of the bits of the memory block have been set to one-logic. If the erasure procedure is made shorter, there is a risk that some of the bits will not be set to one-logic. When a flash memory, having thousands of blocks, has to be erased, and each block is erased using a full-erase cycle, the total erase time may take tens of seconds. In emergency situations, there is a risk that the erasure procedure will be cut short before all of the blocks are erased.

The emergency-erase time can be used more effectively by dedicating a fraction of the 2.5-ms cycle for erasing a block, enabling a lot more blocks to be erased in 2.5 ms. Typically, most of the bits lose their original logical state after less than 50% of the full-erase cycle has been performed. The remaining amount of bits that are not fully erased are so few as to render the information virtually useless. It is thus preferable to erase double the amount of blocks using 50% of the full-erase cycle time, rather than erase 50% of the blocks using the full-erase cycle time. Clearly, the determination of the duration of the interrupted-erase cycle can be set anywhere between 0% and 100% of the nominal full-erase cycle using engineering considerations and assumptions on the total time available for the prioritized-erasure procedure.

One possible way to implement an interrupted-erase cycle is to make use of the fact that flash memory (for both NOR- and NAND-type flash memory), while "blind" to many commands during an array cycle, is responsive to special "abort" commands such as:

(1) a "reset" command in NOR-type flash memory, such as that described in: www.samsung.com/Products/Semiconductor/MCP/NOR_based/K5L5628JBM/K5L5628JBM.htm;
(2) a "suspend erase" command in NOR-type flash memory, such as that described in: electronicstalk.com/news/sor/sor100.html; and
(3) a "reset" command in NAND-type flash memory, such as that described in the data sheet of the Samsung K9F1G08U0A in: www.samsung.com/Products/Semiconductor/NANDFlash/SLC_LargeBlock/1 G bit/K9F1G08U0A/ds_k9f1g08x0a_rev10.pdf.

The data sheet of the Samsung K9F1G08U0A states that, "The device offers a reset feature, executed by writing FFh to the command register. When the device is in Busy state during random read, program or erase mode, the reset operation will abort these operations."

These commands are much shorter than the full-erase cycle (in NAND-type flash memory, a reset command takes a maximum of 0.5 ms while a full-erase cycle takes 2.5 ms). When a full-erase cycle is aborted, the memory is left in a random state that is not useful for any purpose. It is preferable to utilize a 5-ms interval to start five full-erase cycles and abort the cycles after 0.5 ms each (using five reset commands that each consume 0.5 ms), than to perform two complete full-erase cycles. Both alternatives consume the full 5-ms interval.

In a preferred embodiment of the present invention (as shown in Table 1, Embodiment 3), the writing of the first flash unit can be carried out in an arbitrary manner, logging the blocks that receive higher erasure-priority data. Upon writing to the first flash unit, the subsequent flash units are written in an order that is correlated to the order of the first flash unit. Typically, the subsequent flash units are aligned with the high erasure-priority blocks of the first flash unit, so that blocks having the same (or correlated) addresses in all of the flash units receive data having the same erasure-priority. This enables the system to erase high erasure-priority data by erasing blocks having the same address in parallel, without having to go through the construction of logical erase-slices (as described above and shown in FIG. 2).

It should be noted that using fast-erasing blocks for high erasure-priority data and aligning the high erasure-priority data in common physical erase-slices are not conflicting protocols, and can preferably be implemented together. While the high erasure-priority blocks are stored in the "faster parts" of the flash units, the blocks are stored in the first flash unit in a random order. This random order prescribes the order for all the other flash units, resulting in the high erasure-priority data residing in common physical erase-slices.

It should be noted that while erasure in logical erase-slices and erasure in physical erase-slices may lead to the same order of erasure (and therefore, to the same level of optimization), physical erase-slices: (1) are simpler to implement, and (2) require less management and storage of administrative data than in implementations using logical erase-slices. Therefore, implementations using physical erase-slices are preferable.

It should be noted that hard-disk drives are a typical example of storage devices that are covered by the present invention. The present invention is not limited in any way only to flash-memory storage devices, and applies to, and is intended to cover, any storage system that is characterized by at least some of the following features:

(1) the storage device is divided into many sub-units, each of which can be erased individually;
(2) erasure time of a sub-unit is a relatively long process;
(3) complete erasure of a sub-unit takes a lot longer amount of time than an aborted erasure; and
(4) the storage-device controller has the flexibility to store data in any sub-unit.

While the invention has been described with respect to a limited number of embodiments, it will be appreciated that many variations, modifications, and other applications of the invention may be made.

What is claimed is:

1. A method for prioritized erasure of a non-volatile storage device, the method comprising:
providing a plurality of flash units within the storage device, wherein each of the flash units has a plurality of blocks controlled by a single controller contained within the storage device, each block having an erasure priority;
writing data in parallel across blocks of different flash units through the single controller, wherein an erasure priority is assigned to the data based on a position of the corresponding block the data is written;
logging the erasure priority of the data in each of the blocks in a table of the storage device after writing the data;
receiving an erase command from the single controller;
generating a logical erase slice identifying one of the blocks to be erased within each of the flash units, the identifying based on each one of the blocks of the logical erase slice having the same erasure priority, wherein at least one of the blocks to be erased has a different relative address within a flash unit than another one of the blocks; and
partially erasing the data within each block of the logical erase slice in parallel, wherein the partially erasing is executed according to the erasure priority and wherein the partially erasing is set for a time period that is a maximum of 50% of a full erase time period for a single block of the logical erase cycle, and wherein the data within each block remains partially erased.

2. The method of claim 1, wherein the writing is performed on arbitrarily-selected blocks.

3. The method of claim 1, wherein writing is performed according to said erasure-priority of each block.

4. The method of claim 1, wherein the writing is performed in an arbitrary order in a first flash unit, and the writing into subsequent flash units is performed in correlation with said order in said first flash unit.

5. The method of claim 1, further comprising:
   continuing the erasing until all data having the same erasure priority is deleted; and
   erasing additional logical erase slices in parallel for a next erasure priority.

6. A method for prioritized erasure of a hard-disk drive, the method comprising:
   providing a plurality of sectors of the hard-disk drive, each sector having an erasure priority, the hard disk drive. controlled by a single controller contained within the storage device;
   writing data into the plurality of sectors through the single controller, wherein an erasure priority is assigned to the data based on a position of the corresponding block the data is written into;
   logging the erasure priority of the data in each of the sectors in a table of the hard disk drive after writing the data;
   receiving an erase command;
   generating a logical erase slice identifying a plurality of the sectors to be erased within the hard disk drive, the identifying based on each of the plurality of the sectors of the logical erase slice having the same erasure priority; and
   partially erasing the data within each sector of the logical erase slice in parallel, wherein the partially erasing is executed according to the erasure priority and wherein the partially erasing is set for a time period that is a maximum of 50% of a full erase time period for a single sector of the logical erase cycle, and wherein the data within each sector remains partially erased.

* * * * *